United States Patent
Al Sheikh et al.

(10) Patent No.: US 10,303,608 B2
(45) Date of Patent: May 28, 2019

(54) INTELLIGENT DATA PREFETCHING USING ADDRESS DELTA PREDICTION

(71) Applicant: QUALCOMM Incorporated, San Diego, CA (US)

(72) Inventors: Rami Mohammad Al Sheikh, Morrisville, NC (US); Shivam Priyadarshi, Morrisville, NC (US); Brandon Dwiel, Jamaica Plain, MA (US); David John Palframan, Raleigh, NC (US); Derek Hower, Durham, NC (US); Muntaquim Faruk Chowdhury, Durham, NC (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 15/683,391

(22) Filed: Aug. 22, 2017

(65) Prior Publication Data
US 2019/0065375 A1    Feb. 28, 2019

(51) Int. Cl.
| G06F 12/00 | (2006.01) |
| G06F 13/00 | (2006.01) |
| G06F 12/0862 | (2016.01) |
| G06F 12/0875 | (2016.01) |
| G06F 12/1045 | (2016.01) |
| G06F 12/109 | (2016.01) |
| G06F 9/345 | (2018.01) |
| G06F 9/38 | (2018.01) |

(52) U.S. Cl.
CPC ........ *G06F 12/0862* (2013.01); *G06F 9/3455* (2013.01); *G06F 9/383* (2013.01); *G06F 9/3832* (2013.01); *G06F 12/0875* (2013.01); *G06F 12/109* (2013.01); *G06F 12/1063* (2013.01); *G06F 2212/452* (2013.01); *G06F 2212/602* (2013.01)

(58) Field of Classification Search
CPC ............ G06F 12/0862; G06F 12/0875; G06F 12/1063; G06F 12/109; G06F 2212/452; G06F 2212/602
USPC ........................................................ 711/125
See application file for complete search history.

(56) References Cited

U.S. PATENT DOCUMENTS

| 6,047,363 A | * | 4/2000 | Lewchuk ............ G06F 12/0862 711/137 |
| 6,216,219 B1 | | 4/2001 | Cai et al. |

(Continued)

OTHER PUBLICATIONS

Mutlu O., et al., "Address-Value Delta (AVD) Prediction: Increasing the Effectiveness of Runahead Execution by Exploiting Regular Memory Allocation Patterns", Proceedings of the 38th Annual IEEE/ACM International Symposium on Microarchitecture (Micro-38), IEEE, Nov. 12-16, 2005, 12 pages.

(Continued)

*Primary Examiner* — Sheng Jen Tsai
(74) *Attorney, Agent, or Firm* — Patterson & Sheridan, LLP

(57) ABSTRACT

A first load instruction specifying a first virtual address misses in a data cache. A delta value is received based on a program counter value of the first load instruction. A second virtual address is computed based on the delta value and the first virtual address. Data associated with the second virtual address is then prefetched from a main memory to the data cache prior to a second load instruction specifying the second virtual address missing in the data cache.

20 Claims, 12 Drawing Sheets

(56) References Cited

U.S. PATENT DOCUMENTS

| | | | |
|---|---|---|---|
| 6,571,318 B1 | 5/2003 | Sander et al. | |
| 7,472,256 B1* | 12/2008 | Nair | G06F 9/383 |
| | | | 712/207 |
| 7,487,296 B1* | 2/2009 | Iacobovici | G06F 12/0862 |
| | | | 711/137 |
| 7,925,865 B2* | 4/2011 | Chou | G06F 9/3806 |
| | | | 711/137 |
| 10,007,616 B1* | 6/2018 | Feero | G06F 12/0891 |
| 2006/0248279 A1* | 11/2006 | Al-Sukhni | G06F 12/0862 |
| | | | 711/137 |
| 2006/0248280 A1* | 11/2006 | Al-Sukhni | G06F 9/383 |
| | | | 711/137 |
| 2006/0248281 A1* | 11/2006 | Al-Sukhni | G06F 9/383 |
| | | | 711/137 |
| 2007/0101066 A1* | 5/2007 | Al Sukhni | G06F 12/0862 |
| | | | 711/137 |
| 2007/0101100 A1* | 5/2007 | Al Sukhni | G06F 9/30181 |
| | | | 712/207 |
| 2011/0307664 A1* | 12/2011 | Paver | G06F 12/0895 |
| | | | 711/128 |
| 2012/0311270 A1* | 12/2012 | Sun | G06F 12/0862 |
| | | | 711/137 |
| 2013/0339617 A1* | 12/2013 | Averbouch | G06F 12/0862 |
| | | | 711/133 |
| 2014/0237212 A1* | 8/2014 | Garg | G06F 12/0215 |
| | | | 711/205 |
| 2015/0095591 A1* | 4/2015 | Abdallah | G06F 12/0831 |
| | | | 711/146 |
| 2015/0100734 A1* | 4/2015 | Abdallah | G06F 9/30043 |
| | | | 711/125 |
| 2015/0121014 A1 | 4/2015 | Dasika et al. | |
| 2016/0350228 A1* | 12/2016 | Hooker | G06F 12/0864 |
| 2017/0168947 A1* | 6/2017 | Lesecq | G06F 12/0862 |
| 2017/0371790 A1* | 12/2017 | Dwiel | G06F 12/0811 |
| 2018/0018266 A1* | 1/2018 | Jones, III | G06F 12/0862 |

OTHER PUBLICATIONS

International Search Report and Written Opinion—PCT/US2018/044649—ISA/EPO—dated Oct. 11, 2018.

* cited by examiner

INTELLIGENT DATA PREFETCHING USING ADDRESS DELTA PREDICTION

BACKGROUND

Aspects disclosed herein relate to processing systems which implement memory prefetching. More specifically, aspects disclosed herein relate to intelligent data prefetching using address delta prediction.

Prefetching is an optimization used in many processors. Data prefetching attempts to speed up the execution of memory operations by predicting which data is expected to be referenced by a memory operation and prefetching the predicted data into a hardware cache. In this way, the memory operation can execute much faster, rather than waiting for a miss in the cache and incurring the delay to bring the data from main memory and/or higher-level caches.

Some conventional prefetchers, such as a stride prefetcher, attempt to identify a pattern (a stride) in the memory references generated by one or more memory operations that access the same memory region. However, these prefetchers identify such patterns in contiguous memory regions. Furthermore, many programs, when executed, exhibit more complicated, hard to predict memory reference patterns. As such, the useful operation of conventional prefetchers is limited.

SUMMARY

In one aspect, a method comprises determining that a first load instruction specifying a first virtual address misses in a data cache. The method further comprises receiving a delta value based on a program counter value of the first load instruction. The method then computes a second virtual address based on the delta value and the first virtual address. The method further comprises prefetching, from a main memory to the data cache, data associated with the second virtual address prior to a second load instruction specifying the second virtual address missing in the data cache.

In one aspect, a non-transitory computer-readable medium stores instructions that, when executed by a processor, cause the processor to perform an operation comprising determining that a first load instruction specifying a first virtual address misses in a data cache. The operation further comprises receiving a delta value based on a program counter value of the first load instruction. The operation then computes a second virtual address based on the delta value and the first virtual address. The operation further comprises prefetching, from a main memory to the data cache, data associated with the second virtual address prior to a second load instruction specifying the second virtual address missing in the data cache.

In one aspect, an apparatus comprises a data cache, a main memory, and logic configured to perform an operation comprising determining that a first load instruction specifying a first virtual address misses in a data cache. The operation further comprises receiving a delta value based on a program counter value of the first load instruction. The operation then computes a second virtual address based on the delta value and the first virtual address. The operation further comprises prefetching, from a main memory to the data cache, data associated with the second virtual address prior to a second load instruction specifying the second virtual address missing in the data cache.

In one aspect, an apparatus comprises a data cache and a main memory. The apparatus further comprises means for determining that a first load instruction specifying a first virtual address misses in a data cache. The apparatus further comprises means for receiving a delta value based on a program counter value of the first load instruction. The apparatus further comprises means for computing a second virtual address based on the delta value and the first virtual address. The apparatus further comprises means for prefetching, from a main memory to the data cache, data associated with the second virtual address prior to a second load instruction specifying the second virtual address missing in the data cache.

BRIEF DESCRIPTION OF THE SEVERAL VIEWS OF THE DRAWINGS

So that the manner in which the above recited aspects are attained and can be understood in detail, a more particular description of aspects of the disclosure, briefly summarized above, may be had by reference to the appended drawings.

It is to be noted, however, that the appended drawings illustrate only aspects of this disclosure and are therefore not to be considered limiting of its scope, for the disclosure may admit to other aspects.

DETAILED DESCRIPTION

Aspects disclosed herein provide data prefetchers which prefetch data based on the delta value (or difference) between the virtual addresses of two correlated load instruction pairs. Generally, aspects disclosed herein identify correlated load instruction pairs whose memory operations miss in a data cache. The instructions may be correlated based on time and/or dependency (e.g., a first load instruction provides data that is used by a second load instruction). Once a correlated instruction pair is identified, aspects disclosed herein compute the delta value between the virtual addresses of the instructions. Often, the delta value repeats across many of the dynamic instances of each instruction. Therefore, when a subsequent instance of one instruction of the correlated pair is detected, aspects disclosed herein generate a prefetch request based on the computed delta value. Doing so prefetches the data to the data cache to avoid a miss in the data cache for a subsequent instance of the second instruction of the correlated pair.

Figure 1:
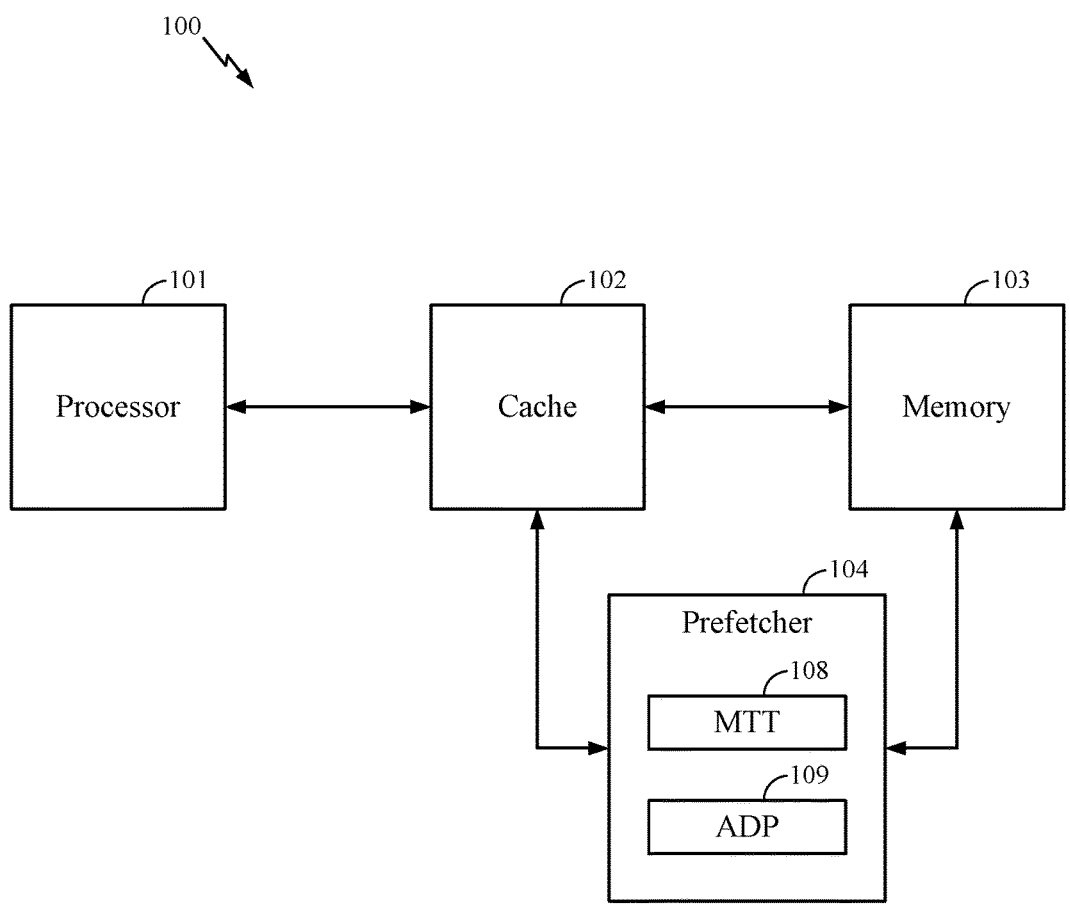
FIG. 1 illustrates a processing system which provides intelligent data prefetching using address delta prediction, according to one aspect.

FIG. 1 illustrates a processing system 100 which provides intelligent data prefetching using address delta prediction. As shown, the processing system 100 includes a processor 101 coupled to a cache 102, a memory 103, and a prefetcher 104. Processor 101 may be a central processing unit (CPU) or any processor core in general. Processor 101 may be configured to execute programs and software which may reference virtual addresses. Cache 102 is representative of one or more caches, each of which may be an instruction cache, a data cache, or a combination thereof. Cache 102, as well as one or more backing caches which may be present (but not explicitly shown) may be in communication with a main memory such as memory 103. For example, in one aspect, the cache 102 comprises a Level 1 (L1) cache. In other aspects, the cache 102 comprises the L1 cache, a Level 2 (L2) cache and a Level 3 (L3) cache. Memory 103 may comprise physical memory in a physical address space and a memory management unit (not pictured) may be used to obtain translations of virtual addresses (e.g., from processor 101) to physical addresses for accessing memory 103. Although the memory 103 may be shared amongst one or more other processors or processing elements, these have not been illustrated, for the sake of simplicity.

During program execution, the processor 101 first looks for needed data in the cache 102. A cache hit represents the case where the needed data resides in cache 102. Conversely, a cache miss represents the case where the needed data does not reside in the cache 102. A cache controller (not pictured) performs data fetches responsive to cache misses, which may be referred to as compulsory fetches. When the cache controller brings the needed data to the cache 102, the cache miss is said to resolve. The prefetcher 104 is a component of the cache controller that prefetches lines of data from the memory 103 (and/or higher levels of the cache 102) to the cache 102 before the processor 101 looks for the data in the cache 102. Doing so may avoid a cache miss in the cache 102.

As shown, the prefetcher 104 includes a miss tracking table (MTT) 108 and an address delta predictor (ADP) 109. The MTT 108 is a hardware structure which stores information describing the most recent memory operations (e.g., load instructions) that miss in the cache 102, and is used by the prefetcher 104 to identify correlated load instruction pairs. The ADP 109 is a hardware structure which stores information describing correlated instruction pairs, including without limitation delta values (e.g., differences) between the virtual addresses of the instruction pairs.

Means for storing data in the cache 102, memory 103, prefetcher 104, MTT 108, and ADP 109 include one or more memory cells. Means for searching and modifying data stored in the cache 102, memory 103, prefetcher 104, MTT 108, and ADP 109 include logic implemented as hardware and/or software. Similarly, the logic implemented as hardware and/or software may serve as means for reading and/or writing values, returning indications of hits and/or misses, evicting entries, and returning values from the cache 102, memory 103, prefetcher 104, MTT 108, and ADP 109. Example of such means logic includes memory controllers, cache controllers, and data controllers.

Figure 2A:
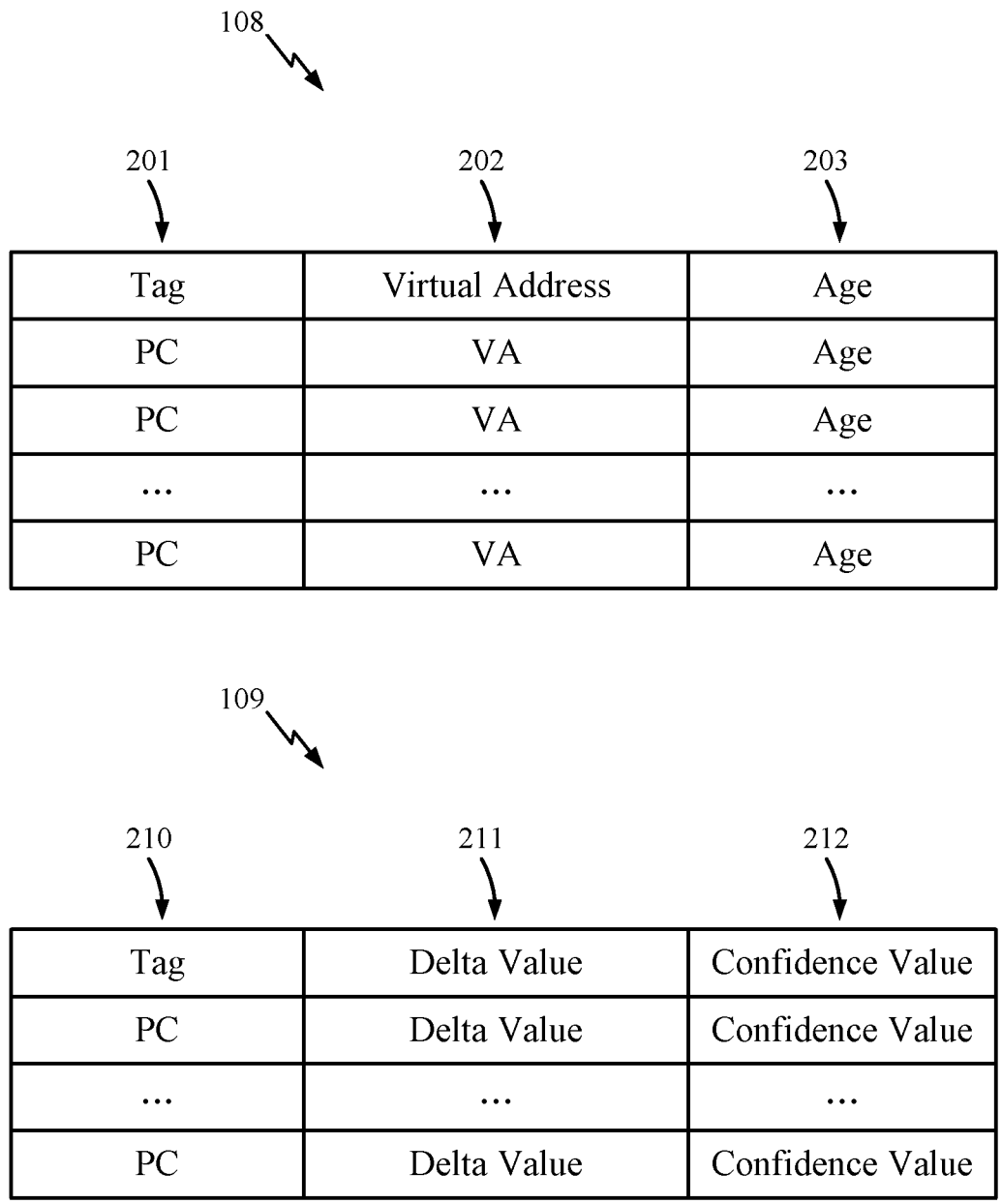
FIGS. 2A-2D illustrate components of a prefetcher, according to various aspects.

FIG. 2A illustrates the MTT 108 and ADP 109 in greater detail, according to one aspect. As shown, the MTT 108 includes a tag 201, a virtual address 202, and an age 203. The MTT 108 is indexed by the tag 201, which stores a program counter (PC) value of an associated load instruction that causes a cache miss in the cache 102. The virtual address 202 stores the virtual memory address that resulted in the cache miss in the cache 102. The age 203 stores an age value for the associated instruction. In at least one aspect, the entries in the MTT 108 are sorted by the age values 203 of the associated instructions. Generally, the age values 203 may be any value indicating a relative age of each instruction. In one aspect, an instruction sequence number is used as the age value 203 for a given instruction. In such aspects, as an instruction enters the execution engine of the processor 101, the processor 101 assigns a unique instruction sequence number to the instruction, which is used as the age value 203 of the instruction. Doing so allows the prefetcher 104 to identify instruction pairs that are correlated based on adjacency in time. The prefetcher 104 may further include logic configured to determine whether the instruction pairs are correlated based on dependency (e.g., where a first load instruction produces a value that is used by a second load instruction). In one aspect, the MTT 108 includes four entries. More generally, however, the MTT 108 may include any number of entries (e.g., two entries, eight entries, etc.).

Generally, an indication of a load instruction that misses in the cache 102 is added to the MTT 108 when the miss resolves and the load instruction is younger than any of the load instructions associated with existing entries in the MTT 108. Stated differently, an indication of a load instruction that misses in the cache 102 is added to the MTT 108 when the cache miss resolves if the age value 203 of the load instruction is younger than one or more of the existing age values 203 in the MTT 108. If the MTT 108 is full when the instruction is added, the oldest instruction (based on the age values 203) is evicted from the MTT 108. When the miss resolves and the instruction is added to the MTT 108, the prefetcher 104 searches for the next oldest instruction in the MTT 108 (e.g., the entry in the MTT 108 having the next oldest age value 203). If such an instruction is found in the MTT 108, the prefetcher 104 determines that the instructions are correlated instruction pairs.

As shown, the ADP 109 includes a tag 210, a delta value 211, and a confidence value 212. The tag 210 corresponds to the program counter value of a first instruction of a correlated instruction pair. In at least one aspect, the tag 210 is the program counter of a "trigger" memory operation, which is the older of the two instructions of the pair (e.g., based on the age values 203 in the MTT 108). The delta value 211 is the difference between the virtual addresses of the correlated instruction pair. The confidence value 212 is a counter which reflects how many times the delta value 211 has repeated during program execution.

Figure 2B:
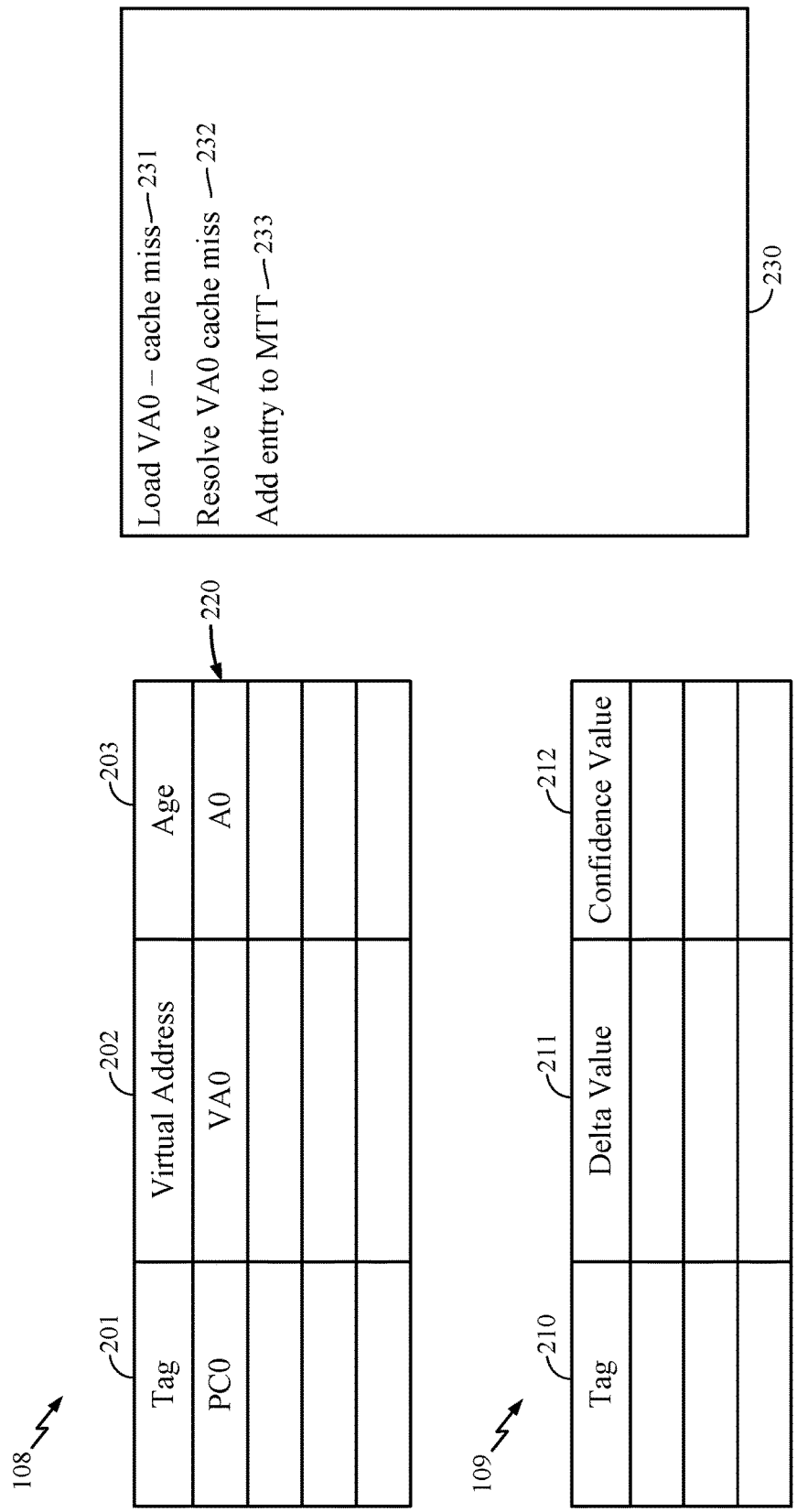

FIG. 2B depicts an example sequence of events 230 which illustrate the use of the MTT 108 and the ADP 109, according to one aspect. As shown, at event 231 a load instruction specifying to load data at an example virtual address of "VA0" misses in the cache 201. At event 232, the cache miss for VA2 resolves, such that the data at VA0 is brought into the cache 102 from the memory 103 (and/or higher levels of the cache 102). At event 233, the prefetcher adds an entry 220 to the MTT 108 for the resolved cache miss upon determining that the example age value 203 of "A0" of the load instruction for VA0 is younger than the age values 203 of any other entries in the MTT 108. Generally, entries are added to the MTT 108 are based on the respective age values 203, such that the MTT 108 is sorted based on the age values 203. In the example depicted in FIG. 2B, there are no other entries in the MTT 108, so the entry 220 is added to the first entry of the MTT 108. As shown, the entry 220 specifies an example tag 201 value of "PC0", a virtual address value 202 of "VA0", and an age value 203 of "A0", where PC0 is the example program counter value for the instruction specifying to load data at VA0, and A0 is the example age value for the instruction. The entry 220 is added in the first entry of the MTT 108, as the age value 232 of A0 is the youngest age value 203 in the MTT 108. Once the entry 220 is added to the MTT 108, the prefetcher 104 determines whether a pair instruction for the load of VA0 exists in the MTT 108. However, because the MTT 108 includes a single entry, the prefetcher 104 determines that a pair instruction does not currently exist in the MTT 108.

Figure 2C:
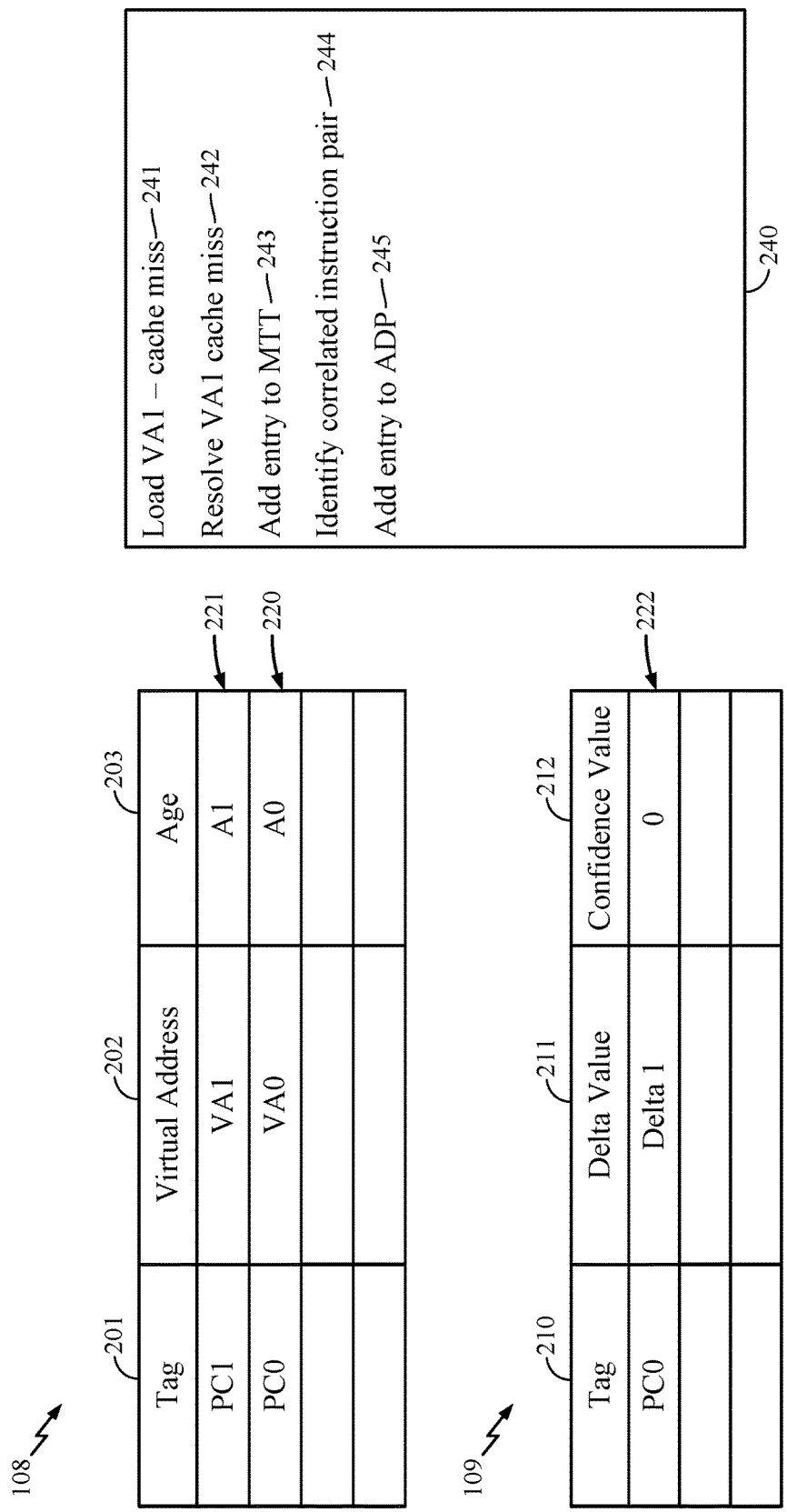

FIG. 2C depicts an example sequence of events 240 which illustrate the use of the MTT 108 and the ADP 109, according to one aspect. As shown, the sequence of events 240 includes an event 241, where a load instruction specifying to load data at an example virtual address of "VA1" misses in the cache 201. At event 242, the cache miss for VA1 resolves, such that the data at VA1 is brought into the cache 102 from the memory 103 (and/or higher levels of the cache 102). At event 243, the prefetcher adds an entry 221 to the MTT 108 for the resolved cache miss upon determining that the age value 203 of A1 for the load instruction VA2 is younger than the age values 203 of any other entries in the MTT 108. Assuming the age value of "A1" is younger than the age value "A0", the prefetcher 104 adds the entry 221 to the MTT 108. Furthermore, as shown, since the age value of "A1" is younger than the age value of "A0", the entry 221 is added to the first entry of the MTT 108, and the entry 220 is moved (or added) to the second entry of the MTT 108, as the MTT 108 is sorted by the age values 203.

Once the entry 221 is added to the MTT 108, the prefetcher 104 determines whether a pair instruction for the load of VA1 exists in the MTT 108 at event 244. As previously indicated, the prefetcher 104 searches for the next oldest instruction in the MTT 108 as a pair instruction. As such, the prefetcher 104 identifies the load instruction for VA0 in entry 220 as the pair instruction based for the load instruction VA1 based on the age value 203 of A0 being the next oldest age value 203 in the age-sorted MTT 108. Therefore, at event 245, the prefetcher 104 creates an entry 222 for the correlated instruction pair in the ADP 109. As shown, the prefetcher 104 creates the entry 222 in the ADP 109 using the example program counter value of "PC0" (e.g., from entry 220 of the MTT 108). Furthermore, the entry 222 in the ADP 109 includes an example delta value 211 of "Delta1", which is the computed difference of the virtual addresses "VA0" and "VA1" (e.g., VA0−VA1). The entry 222 further includes an example confidence value 212 of zero.

More generally, before creating the entry 222 in the ADP 109, the prefetcher 104 computes the delta value between the virtual addresses 202 of the identified instruction pair in the MTT 108. The prefetcher 104 then determines whether the computed delta value exists in the ADP 109. If the computed delta value exists in an entry in the ADP 109, the prefetcher 104 increments the confidence value 212 of the associated entry. However, if the computed delta value does not exist in any entry of the ADP 109, the prefetcher 104 allocates a new entry, and sets the confidence value 212 to zero. In at least one aspect, if no free entries remain in the ADP 109, the prefetcher 104 allocates a new entry in the ADP 109 by searching for an entry having a confidence value 212 of zero. If such an entry exists, the prefetcher 104 reallocates this entry. If no such entry exists, the prefetcher 104 decrements the confidence value 212 of one (or more) of the entries in the ADP 109, but does not replace any of the decremented entries. Instead, after one or more failed allocations in the ADP 109, at least one confidence value 212 will hit the required value of zero, and a new entry can be allocated.

Figure 2D:
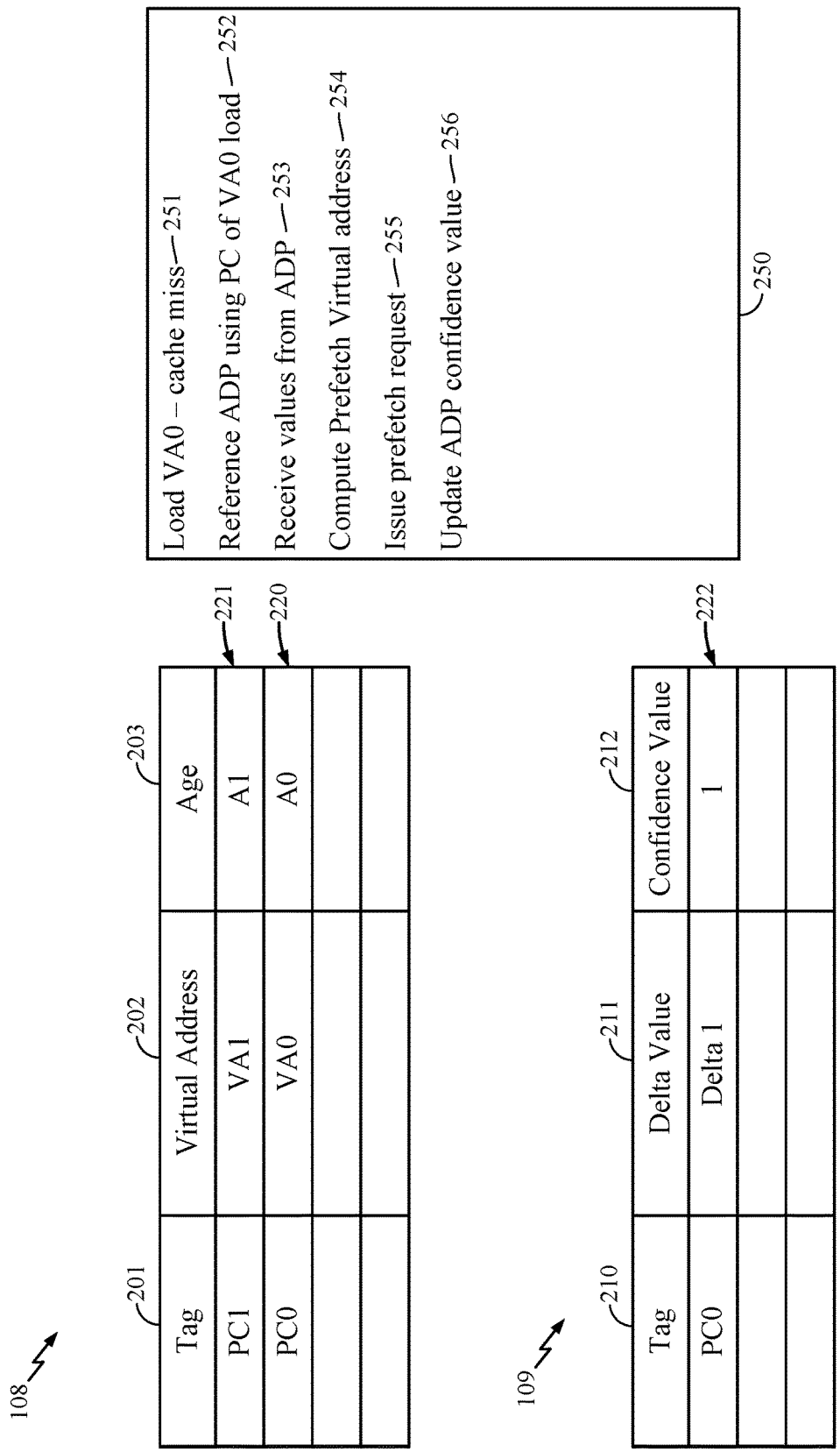

FIG. 2D depicts an example sequence of events 250 which illustrate the use of the ADP 109 to issue prefetch requests using address delta prediction, according to one aspect. Generally, the prefetcher 104 leverages the ADP 109 to prefetch data to the cache 102 based on address value deltas that repeat during program execution. As shown, at event 251, a load instruction for VA0 misses in the cache 102. At event 252, the prefetcher 104 references the ADP 109 using the PC value of the missing instruction. If there is a "hit" in the ADP 109 (e.g., an entry in the ADP 109 has a tag 210 that matches the PC of the missing load instruction VA0), the prefetcher 104 receives the data from entry 222, including the delta value 211 of "Delta1" at event 253. At event 254, the prefetcher 104 computes a prefetch virtual address value using the virtual address of the missing load instruction and the delta value 211 received from the ADP 109. In at least one aspect, the prefetch virtual address is computed by summing the delta value 211 ("Delta1") and the virtual address ("VA0") of the missing load instruction (e.g., VA0+Delta1).

In at least one aspect, the prefetcher 104 determines whether the associated confidence value 212 exceeds a confidence threshold before computing the prefetch virtual address at event 254. The confidence threshold may be any value. In one aspect, the confidence threshold is zero. At event 255, the prefetcher 104 issues a prefetch request specifying to prefetch the data stored at the prefetch memory address to the data cache 102.

Once the prefetch request is processed, the prefetcher 104 updates the associated confidence value 212 in the ADP 109 at event 256. As shown, the prefetcher 104 has incremented the confidence value 212 of entry 222 to 1. Generally, if the prefetch misses in the L1 cache, the confidence value 212 in the ADP 109 is incremented. Furthermore, if program execution continues, and a demand request specifying the prefetch virtual address hits on a miss status holding register (MSHR) allocated by the prefetcher 104, the prefetcher 104 increments the confidence value 212 for the associated entry in the ADP 109. However, if the prefetch hits in the cache 102, the confidence value 212 in the ADP 109 is decremented. Furthermore, if the prefetch request merges with an existing MSHR, the prefetcher 104 decrements the confidence value 212 for the entry in the ADP 109.

In some aspects, the prefetcher 104 leverages a reorder buffer (ROB) rather than the MTT 108. In such aspects, the prefetcher 104 walks the ROB backwards when a miss in the cache 102 resolves to identify an older instruction in the ROB which missed in the cache 102. If the older instruction is identified, the prefetcher 104 determines that the instructions are correlated instruction pairs, and creates an entry for the pair in the ADP 109.

Figure 3:
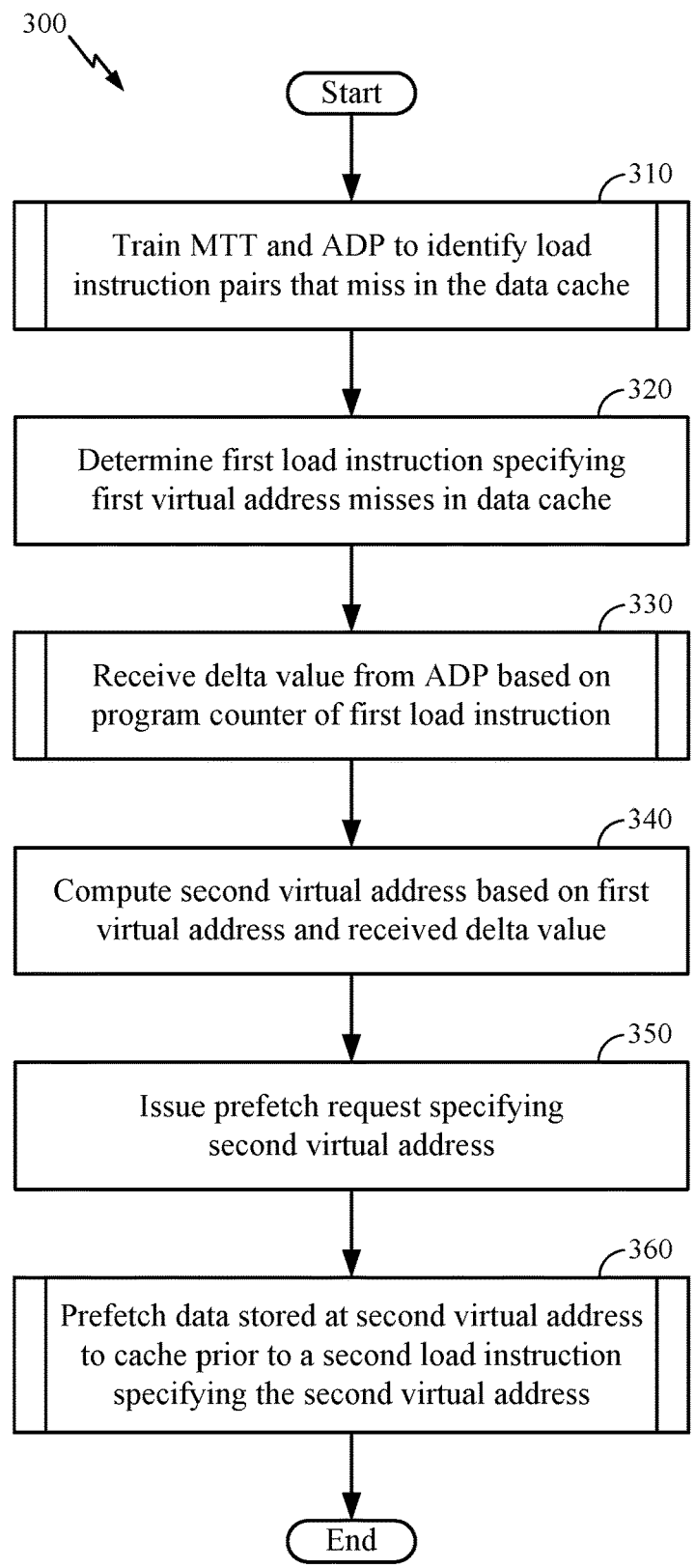
FIG. 3 is a flow chart illustrating an example method for intelligent data prefetching using address delta prediction, according to one aspect.

FIG. 3 is a flow chart illustrating an example method 300 for intelligent data prefetching using address delta prediction, according to one aspect. As shown, the method 300 includes block 310, where the MTT 108 and the ADP 109 are trained to identify load instruction pairs that miss in the data cache 102. As previously stated, the MTT 108 tracks the most recently resolved data cache misses. The prefetcher 104 uses the MTT 108 to identify load instruction pairs that are correlated based on time and/or dependency. Once a correlated pair is identified in the MTT 108, the prefetcher 104 allocates an entry in the ADP 109. Block 310 is described in greater detail with reference to FIG. 4.

At block 320, the processor 101 and/or the prefetcher 104 determines that a first load instruction specifying a first virtual address misses in the data cache 102. At block 330, described in greater detail with reference to FIG. 7, the prefetcher 104 receives a delta value 211 and confidence value 212 from the ADP 109 based on the program counter of the first load instruction. At block 340, the prefetcher 104 computes a second virtual address based on the first virtual address and the received delta value 211. In at least one aspect, the prefetcher 104 computes the second virtual address by summing the first virtual address and the received delta value 211. However, as previously stated, the prefetcher 104 may determine whether the confidence value 212 received at block 330 exceeds a threshold before computing the second virtual address. At block 350, the prefetcher 104 issues a prefetch request specifying the second virtual address. At block 360, described in greater detail with reference to FIG. 8, the data stored at the second virtual address is prefetched to the data cache 102. Doing so may avoid a miss in the data cache 102 for a subsequent, second load instruction that specifies the second virtual address.

Figure 4:
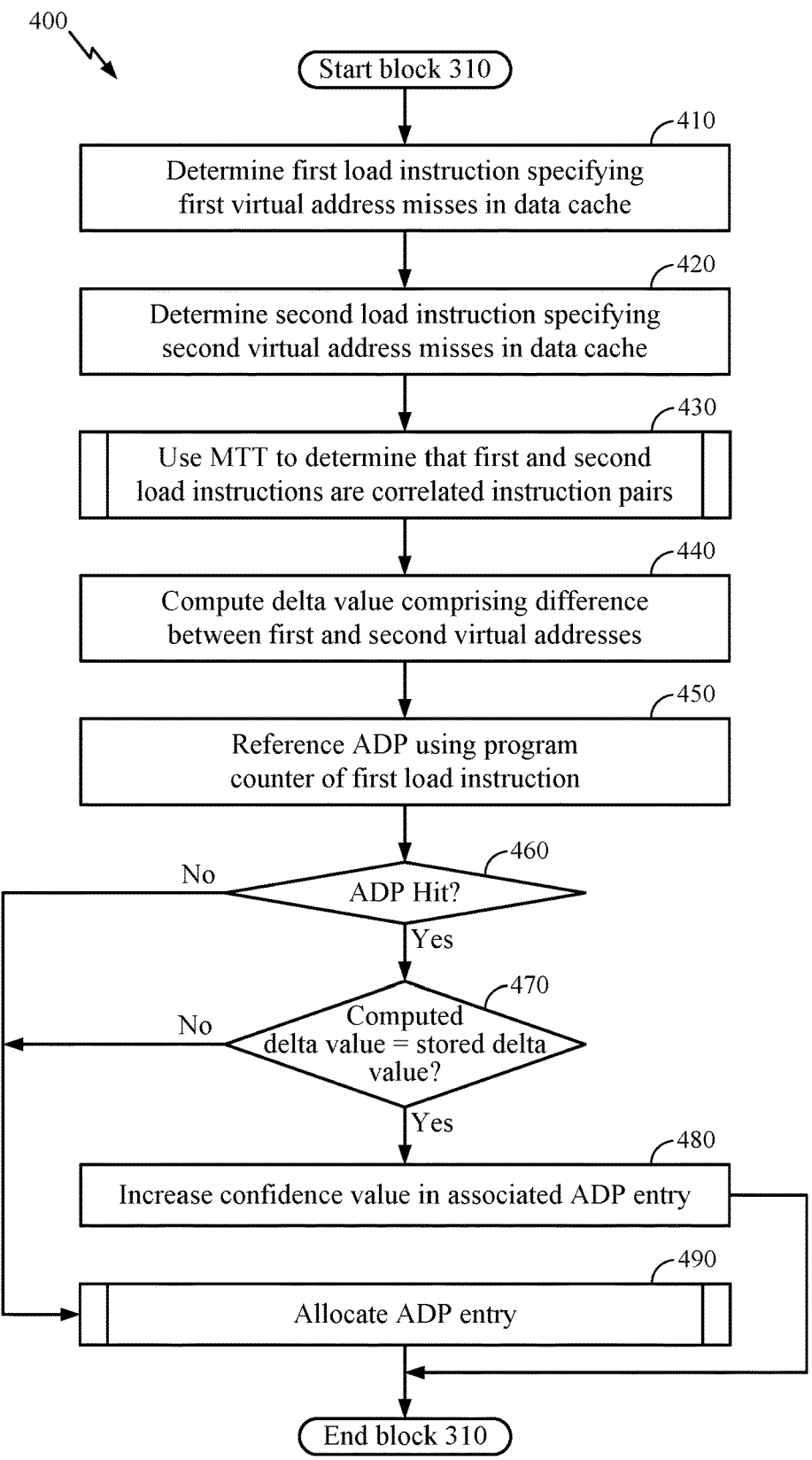
FIG. 4 is a flow chart illustrating an example method to identify load instruction pairs that miss in a data cache, according to one aspect.

FIG. 4 is a flow chart illustrating an example method 400 corresponding to block 310 to identify load instruction pairs that miss in a data cache, according to one aspect. As shown, the method 400 includes block 410, where the processor 101 and/or the prefetcher 104 determines that a first load instruction specifying a first virtual address misses in the data cache 102. At block 420, the processor 101 and/or the prefetcher 104 determines that a second load instruction specifying a second virtual address misses in the data cache 102. At block 430, described in greater detail with reference to FIG. 5, the prefetcher 104 uses the MTT 108 to determine that the first and second load instructions are correlated load instruction pairs. Generally, as a cache miss is resolved, the associated instruction is added to the MTT 108 if its age is younger than any of the instructions in the MTT 108. When an instruction is added to the MTT 108, the prefetcher 104 identifies the next oldest instruction in the MTT 108 (if present) as being the correlated instruction pair for the added instruction.

At block 440, the prefetcher 104 computes a delta value for the correlated load instruction pairs. The prefetcher 104 computes the delta value based on the difference of the virtual addresses of the load instructions of the pair. In at least one aspect, the prefetcher 104 computes the difference between the virtual address of the older load instruction of the pair and the virtual address of the younger load instruction of the pair. At block 450, the prefetcher 104 references the ADP 109 using the program counter of the first load instruction. At block 460, the prefetcher 104 determines whether there was a hit for the program counter of the first load instruction in the ADP 109. If there is not a hit in the ADP 109, the method proceeds to block 490, described in greater detail with reference to FIG. 6, where the prefetcher 104 attempts to allocate an entry in the ADP 109 for the correlated load instruction pair.

Returning to block 460, if there is a hit in the ADP 109, the method proceeds to block 470, where the prefetcher 104 determines whether the delta value computed at block 440 equals a delta value 211 in the entry of the ADP 109 matching the program counter of the first load instruction. If the computed delta value equals the delta value 211 stored in the ADP 109, the method proceeds to block 480, where the prefetcher 104 increases (e.g., increments) the confidence value 212 in the associated entry of the ADP 109. However, returning to block 470, if the computed delta value does not equal the stored delta value, the method proceeds to block 490, where the prefetcher 104 attempts to allocate an entry in the ADP 109 for the correlated load instruction pair.

Figure 5:
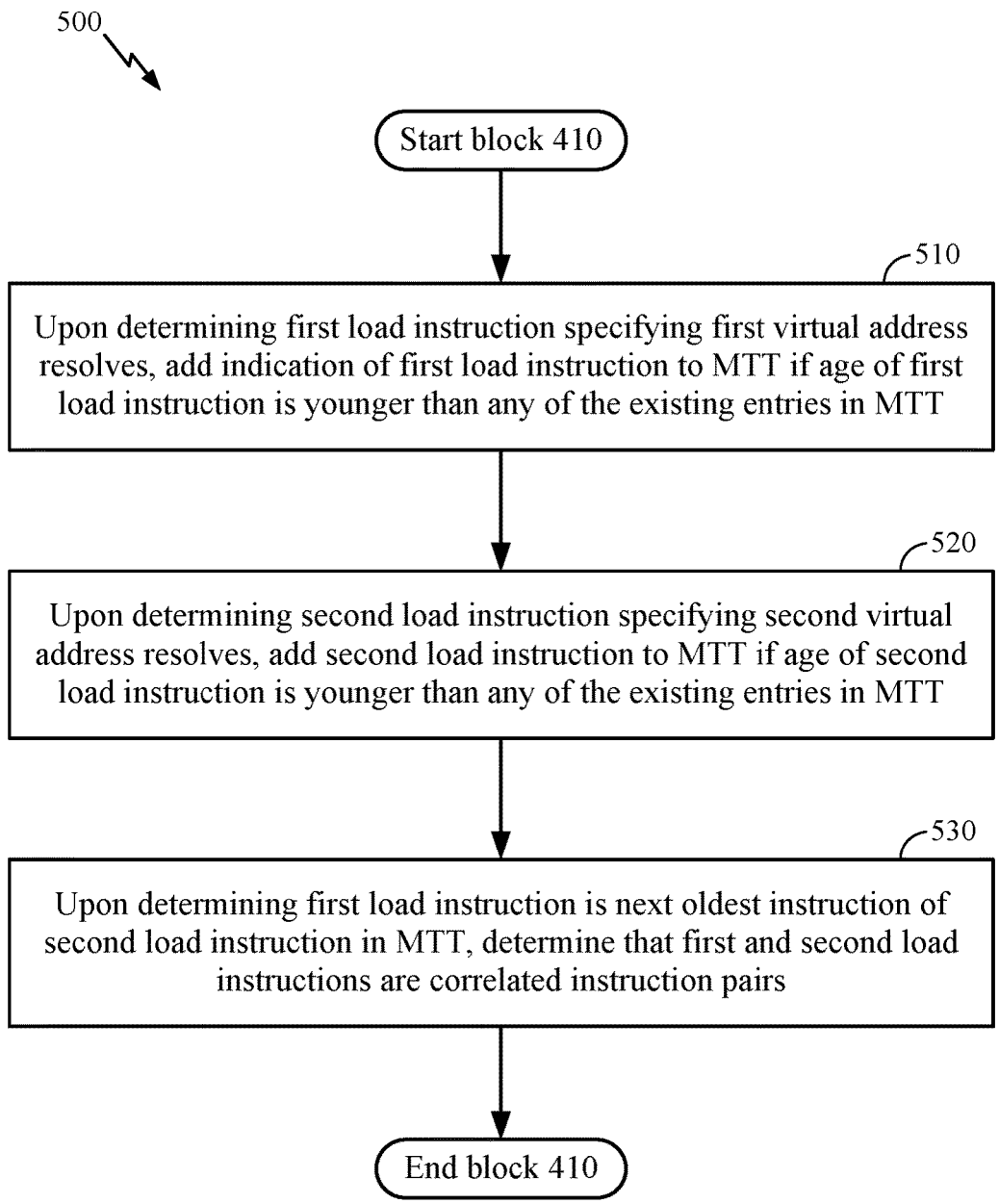
FIG. 5 is a flow chart illustrating an example method to determine that two instructions are correlated instruction pairs, according to one aspect.

FIG. 5 is a flow chart illustrating an example method 500 corresponding to block 510 to determine that two instructions are correlated instruction pairs, according to one aspect. As shown, the method 500 includes block 510, where the prefetcher 104 adds an indication of the first load instruction to the MTT 108 upon determining the miss in the data cache 102 resolves and the age of the first load instruction is younger than any of the existing entries in the MTT 108. At block 520, the prefetcher 104 determines that the first and second load instructions are correlated instruction pairs upon determining that the first load instruction is the next oldest instruction of the second load instruction (based on the respective age values 203 in the MTT 108). As previously stated, once the correlated load pair is identified, the prefetcher 104 allocates an entry in the ADP 109 for the pair.

Figure 6:
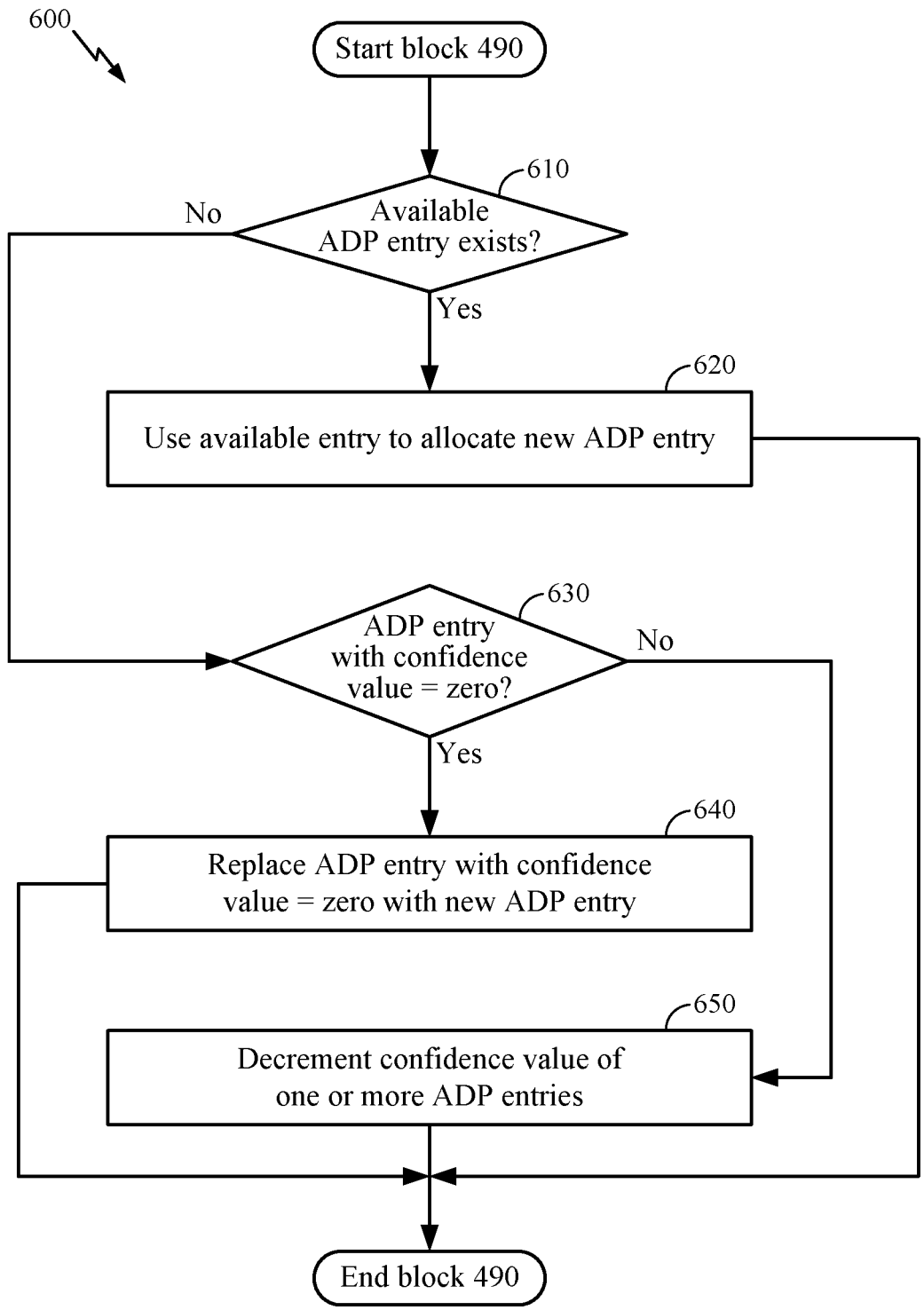
FIG. 6 is a flow chart illustrating an example method to allocate an address delta prediction entry, according to one aspect.

FIG. 6 is a flow chart illustrating an example method 600 corresponding to block 490 to attempt to allocate an entry in the ADP 109, according to one aspect. As shown, the method 600 includes block 610, where the prefetcher 104 determines whether an available entry exists in the ADP 109. If an available entry exists, the method proceeds to block 620, where prefetcher 104 uses the available entry to allocate the new entry in the ADP 109. If no available entry exists in the ADP 109, the method proceeds to block 630, where the prefetcher 104 determines whether an entry exists in the ADP 109 having a confidence value 212 equal to zero. If such an entry exists, the method proceeds to block 640, where the prefetcher 104 replaces the identified entry having a confidence value 212 equal to zero with a new entry in the ADP 109. If there are no entries having confidence values equal to zero, the method proceeds to block 650, where the prefetcher 104 decrements the confidence value 212 of one or more (or all) of the entries in the ADP 109. However, as such, the prefetcher 104 does not evict any of the entries, and a new entry is not allocated in the ADP 109. Doing so allows the ADP 109 to retain useful entries (e.g., those entries having high confidence values 212) for as long as possible.

Figure 7:
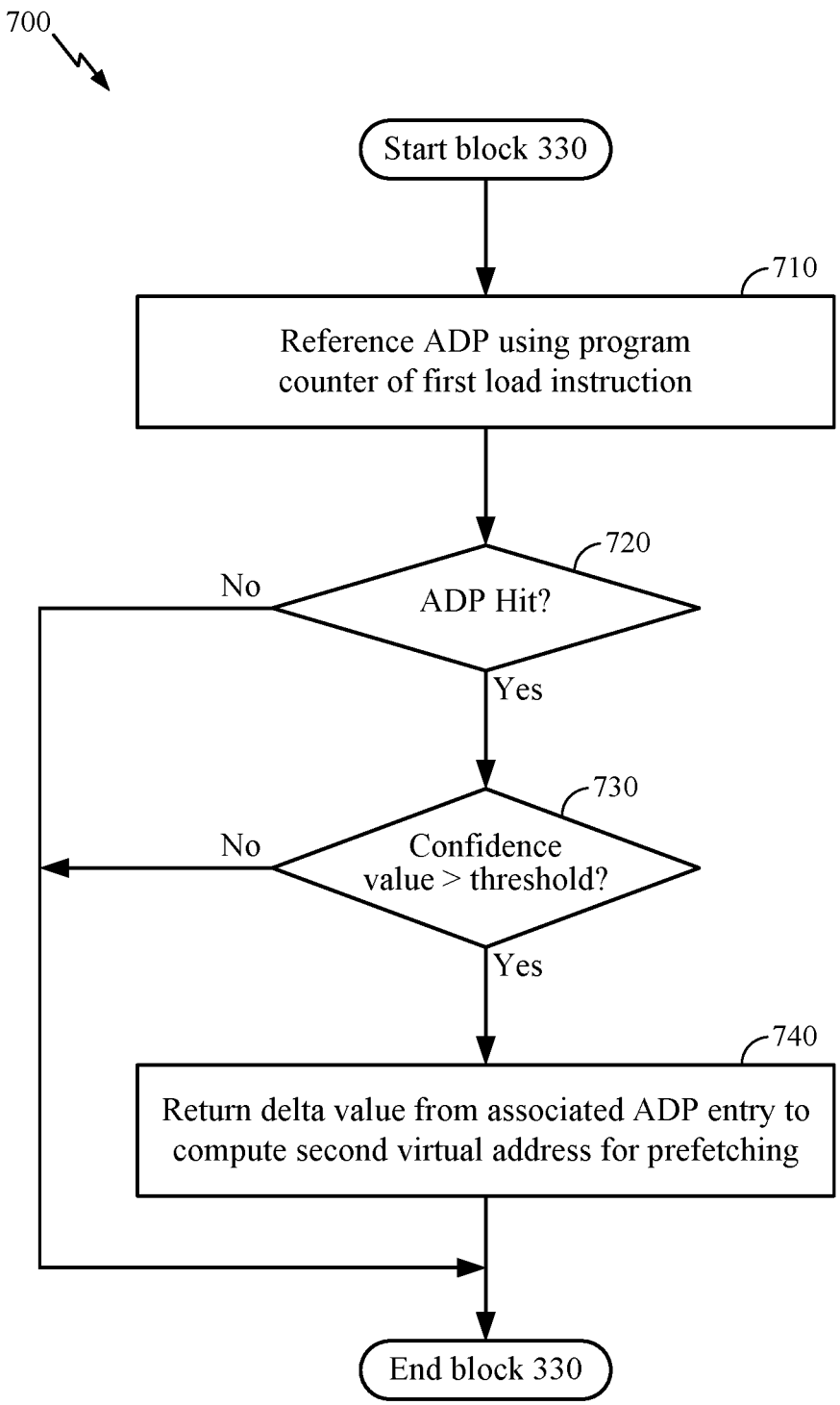
FIG. 7 is a flow chart illustrating an example method to receive a delta value based on a program counter of a first virtual address, according to one aspect.

FIG. 7 is a flow chart illustrating an example method 700 corresponding to block 330 to receive a delta value based on a program counter of a first load instruction, according to one aspect. As shown, the method 700 includes block 710, where the prefetcher 104 references the ADP 109 using the program counter of the first load instruction. At block 720, the prefetcher 104 determines whether there was a hit in the ADP 109 (e.g., whether an entry in the ADP 109 has a tag value 210 matching the program counter of the first load instruction). If there is not a hit in the ADP 109, the prefetcher 104 cannot use any of the delta values 211 in the ADP 109 to compute a second virtual address and generate a prefetch request specifying the second virtual address. If there is a hit in the ADP 109, the method proceeds to block 730, where the prefetcher 104 determines whether the confidence value 212 in the associated entry in the ADP 109 exceeds a threshold. If the confidence value 212 exceeds the threshold, the method proceeds to block 740, where the delta value 211 is returned and used by the prefetcher 104 to compute the second virtual address, and issue a prefetch request specifying the second virtual address.

Figure 8:
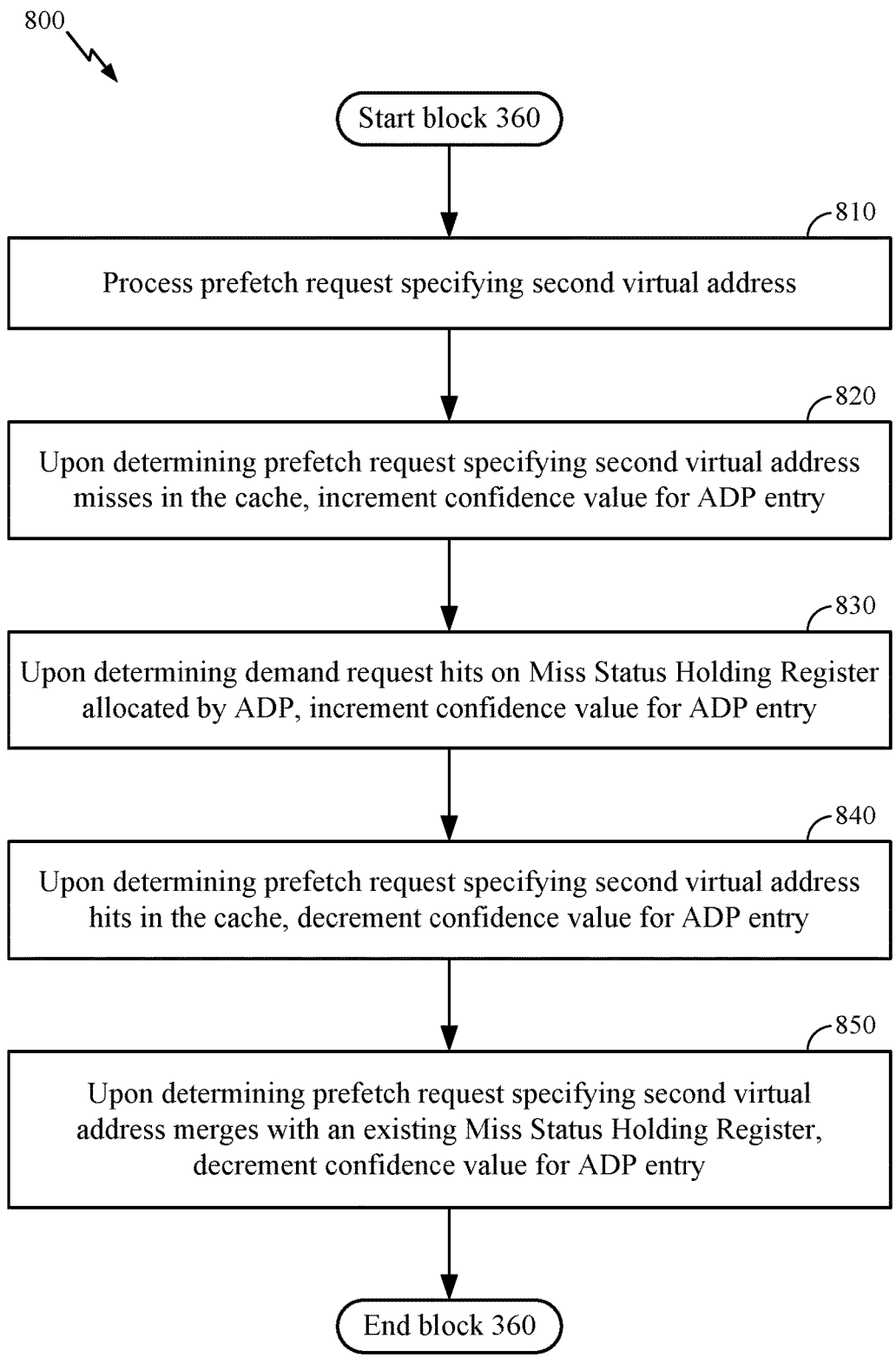
FIG. 8 is a flow chart illustrating an example method to prefetch data stored at a second virtual address, according to one aspect.

FIG. 8 is a flow chart illustrating an example method 800 corresponding to block 360 to prefetch data stored at a second virtual address, according to one aspect. As shown, the method 800 begins at block 810, where the prefetcher 104 processes the prefetch request specifying the second virtual address generated at block 350. At block 820, the prefetcher 104 increments the confidence value 212 of the entry of the ADP 109 returned at block 330 upon determining that the prefetch request misses in the data cache 102. At block 830, the prefetcher 104 increments the confidence value 212 of the entry of the ADP 109 returned at block 330 upon determining that a demand request hits on a miss status holding register allocated by the ADP 109. At block 840, the prefetcher 104 decrements the confidence value 212 of the entry of the ADP 109 returned at block 330 upon determining that the prefetch request hits in the data cache 102. At block 850, the prefetcher 104 decrements the confidence value 212 of the entry of the ADP 109 returned at block 330 upon determining that the prefetch request specifying the second virtual address merges with an existing miss status holding register.

Figure 9:
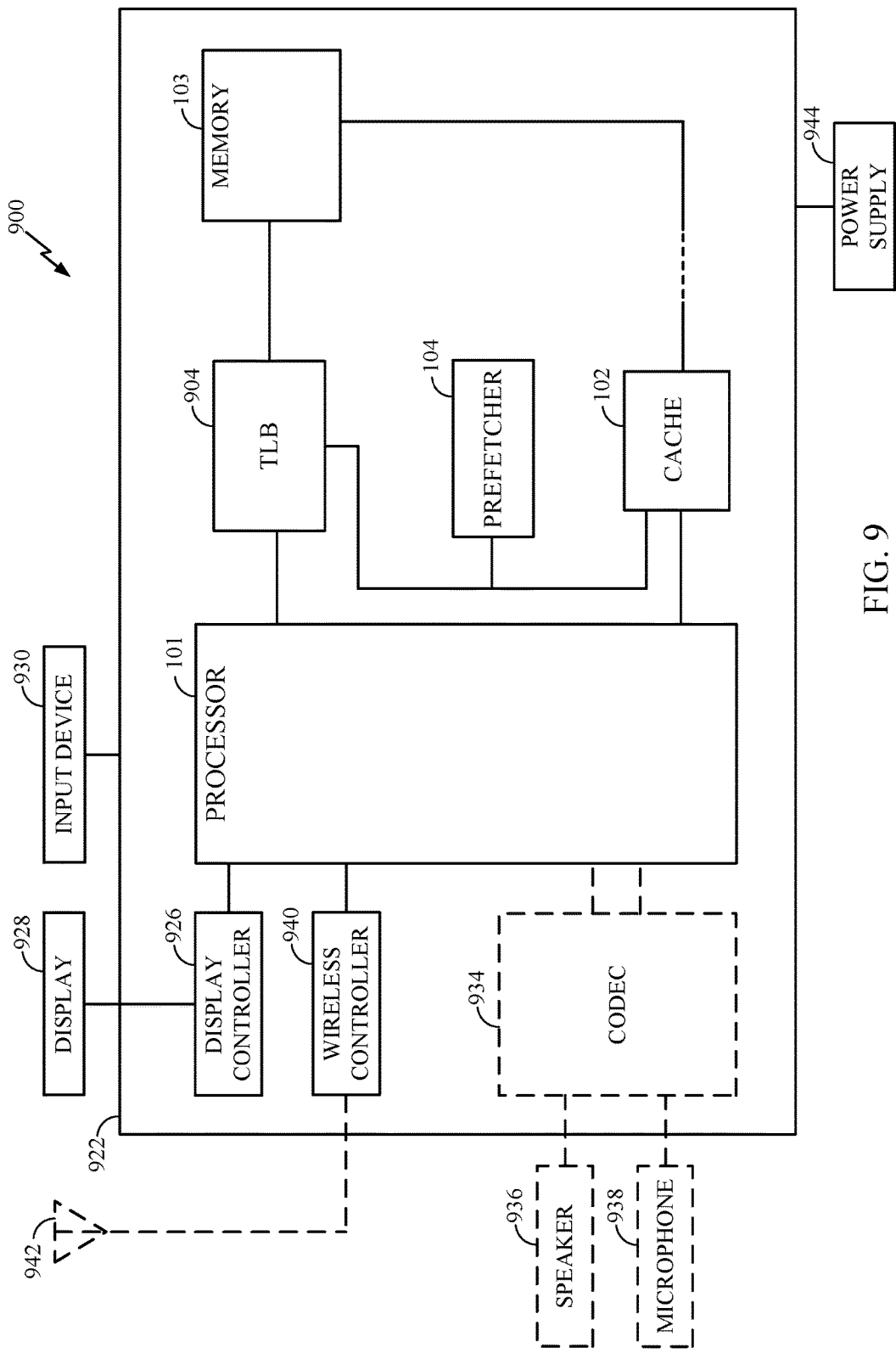
FIG. 9 is a block diagram illustrating a computing device integrating a prefetcher which performs intelligent data prefetching using address delta prediction, according to one aspect.

An example apparatus in which exemplary aspects of this disclosure may be utilized is discussed in relation to FIG. 9. FIG. 9 shows a block diagram of computing device 900. Computing device 900 may correspond to an exemplary implementation of a processing system configured to perform the methods depicted in FIGS. 3-8. In the depiction of FIG. 9, computing device 900 includes processor 101, cache 102, memory 103, the prefetcher 104, and a translation lookaside buffer (TLB) 904. The TLB 904 is part of a memory management unit (not pictured) which is used to obtain translations of virtual addresses to physical addresses for accessing the cache 102 and/or the memory 103. More generally, the computing device is configured to implement all apparatuses, logic, and methods discussed above with reference to FIGS. 1-8.

FIG. 9 also shows display controller 926 that is coupled to processor 101 and to display 928. In some cases, computing device 900 may be used for wireless communication and FIG. 9 also shows optional blocks in dashed lines, such as coder/decoder (CODEC) 934 (e.g., an audio and/or voice CODEC) coupled to processor 101 and speaker 936 and microphone 938 can be coupled to CODEC 934; and wireless antenna 942 coupled to wireless controller 940 which is coupled to processor 101. Where one or more of these optional blocks are present, in a particular aspect, processor 101, display controller 926, memory 103, and wireless controller 940 are included in a system-in-package or system-on-chip device 922.

Accordingly, in a particular aspect, input device 930 and power supply 944 are coupled to the system-on-chip device 922. Moreover, in a particular aspect, as illustrated in FIG. 9, where one or more optional blocks are present, display 928, input device 930, speaker 936, microphone 938, wireless antenna 942, and power supply 944 are external to the system-on-chip device 922. However, each of display 928, input device 930, speaker 936, microphone 938, wireless antenna 942, and power supply 944 can be coupled to a component of the system-on-chip device 922, such as an interface or a controller.

Although FIG. 9 generally depicts a computing device, processor 101, cache 102, memory 103, and prefetcher 104 may also be integrated into a set top box, a music player, a video player, an entertainment unit, a navigation device, a personal digital assistant (PDA), a fixed location data unit, a server, a computer, a laptop, a tablet, a communications device, a mobile phone, or other similar devices.

Advantageously, aspects disclosed herein provide an enhanced data prefetcher 104 that observes virtual address deltas that repeat during program execution. Aspects disclosed herein train the MTT 108 based on prior instances of load instructions that miss in the cache to identify correlated load instruction pairs. Once a correlated load instruction pair is identified, an entry is created in the ADP 109 for the pair. The prefetcher 104 may then use the information in the ADP 109 to predict when subsequent instances of the address value deltas will repeat, and generate prefetch requests to avoid a miss in the cache 102 for the subsequent instances of the second instruction of the correlated instruction pair.

A number of aspects have been described. However, various modifications to these aspects are possible, and the principles presented herein may be applied to other aspects as well. The various tasks of such methods may be implemented as sets of instructions executable by one or more arrays of logic elements, such as microprocessors, embedded controllers, or IP cores.

The various operations of methods described above may be performed by any suitable means capable of performing the operations, such as a processor, firmware, application specific integrated circuit (ASIC), gate logic/registers, memory controller, or a cache controller. Generally, any operations illustrated in the Figures may be performed by corresponding functional means capable of performing the operations.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. Some or all such files may be provided to fabrication handlers who configure fabrication equipment using the design data to fabricate the devices described herein. Resulting products formed from the computer files include semiconductor wafers that are then cut into semiconductor die (e.g., the processor 101) and packaged, and may be further integrated into products including, but not limited to, mobile phones, smart phones, laptops, netbooks, tablets, ultrabooks, desktop computers, digital video recorders, set-top boxes and any other devices where integrated circuits are used.

In one aspect, the computer files form a design structure including the circuits described above and shown in the Figures in the form of physical design layouts, schematics, a hardware-description language (e.g., Verilog, VHDL, etc.). For example, design structure may be a text file or a graphical representation of a circuit as described above and shown in the Figures. Design process preferably synthesizes (or translates) the circuits described below into a netlist, where the netlist is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. In another aspect, the hardware, circuitry, and method described herein may be configured into computer files that simulate the function of the circuits described above and shown in the Figures when executed by a processor. These computer files may be used in circuitry simulation tools, schematic editors, or other software applications.

The implementations of aspects disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such aspects.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

The invention claimed is:

1. A method, comprising:
   prior to determining that a first load instruction specifying a first virtual address misses in a data cache:
     determining that a prior instance of an instruction specifying a second virtual address misses in the data cache,
     determining that the miss of the prior instance of the instruction specifying the second virtual address resolves,
     storing an indication of the prior instance of the instruction specifying the second virtual address in a miss tracking table (MTT), and
     determining, based on respective age values stored in the MTT, that a prior instance of the instruction specifying the first virtual address is the next oldest instruction that missed in the data cache relative to the prior instance of the instruction specifying the second virtual address;
   determining that the first load instruction specifying the first virtual address misses in the data cache;
   receiving, from an address delta predictor (ADP), a delta value based on a program counter value of the first load instruction;
   determining that a confidence value received from the ADP based on the program counter value of the first load instruction exceeds a predefined threshold;
   computing the second virtual address based on the delta value and the first virtual address; and
   prefetching, from a main memory to the data cache, data associated with the second virtual address prior to a second load instruction specifying the second virtual address missing in the data cache.

2. The method of claim 1, further comprising:
   computing the delta value based on a difference of the first and second virtual addresses of the prior instances of the instructions specifying the first and second virtual addresses, respectively; and
   storing an indication of: (i) the program counter value, (ii) the computed delta value, and (iii) the confidence value in the ADP, wherein the program counter value of the first load instruction and the prior instance of the instruction specifying the first virtual address.

3. The method of claim 1, further comprising prior to storing the indication of the prior instance of the instruction specifying the second virtual address in the MTT:
   determining that the prior instance of the instruction specifying the first virtual address missed in the data cache;
   determining that the miss of the prior instance of the instruction specifying the first virtual address resolves; and
   storing an indication of the prior instance of the instruction specifying the first virtual address in the MTT.

4. The method of claim 3, wherein the MTT comprises a plurality of entries, wherein each entry of the MTT is configured to store: (i) a program counter value, (ii) a virtual address, and (iii) an age value of a respective load instruction specifying a respective virtual address that misses in the data cache.

5. The method of claim 1, further comprising:
   upon determining that the prefetching is served by the data cache, decrementing the confidence value in the ADP; and
   upon determining that the prefetching is served by the main memory, incrementing the confidence value in the ADP.

6. A non-transitory computer-readable medium storing instructions that, when executed by a processor, cause the processor to perform an operation comprising:
   prior to determining that a first load instruction specifying a first virtual address misses in a data cache:
     determining that a prior instance of an instruction specifying a second virtual address misses in the data cache,
     determining that the miss of the prior instance of the instruction specifying the second virtual address resolves,
     storing an indication of the prior instance of the instruction specifying the second virtual address in a miss tracking table (MTT), and
     determining, based on respective age values stored in the MTT, that a prior instance of the instruction specifying the first virtual address is the next oldest instruction that missed in the data cache relative to the prior instance of the instruction specifying the second virtual address;
   determining that the first load instruction specifying the first virtual address misses in the data cache;
   receiving, from an address delta predictor (ADP), a delta value based on a program counter value of the first load instruction;
   determining that a confidence value received from the ADP based on the program counter value of the first load instruction exceeds a predefined threshold;
   computing the second virtual address based on the delta value and the first virtual address; and
   prefetching, from a main memory to the data cache, data associated with the second virtual address prior to a second load instruction specifying the second virtual address missing in the data cache.

7. The non-transitory computer-readable medium of claim 6, the operation further comprising:
   computing the delta value based on a difference of the first and second virtual addresses of the prior instances of the instructions specifying the first and second virtual addresses, respectively; and storing an indication of: (i) the program counter value, (ii) the computed delta value, and (iii) the confidence value in the ADP, wherein the program counter value of the first load instruction and the prior instance of the instruction specifying the first virtual address.

8. The non-transitory computer-readable medium of claim 6, the operation further comprising prior to storing the indication of the prior instance of the instruction specifying the second virtual address in the MTT:

determining that the prior instance of the instruction specifying the first virtual address missed in the data cache;

determining that the miss of the prior instance of the instruction specifying the first virtual address resolves; and storing an indication of the prior instance of the instruction specifying the first virtual address in the MTT.

9. The non-transitory computer-readable medium of claim 8, wherein the MTT comprises a plurality of entries, wherein each entry of the MTT is configured to store: (i) a program counter value, (ii) a virtual address, and (iii) an age value of a respective load instruction specifying a respective virtual address that misses in the data cache.

10. The non-transitory computer-readable medium of claim 6, the operation further comprising:

upon determining that the prefetching is served by the data cache, decrementing the confidence value in the ADP; and upon determining that the prefetching is served by the main memory, incrementing the confidence value in the ADP.

11. An apparatus, comprising:
an address delta predictor (ADP);
a data cache;
a main memory; and
logic configured to perform an operation comprising:
  prior to determining that a first load instruction specifying a first virtual address misses in a data cache:
    determining that a prior instance of an instruction specifying a second virtual address misses in the data cache,
    determining that the miss of the prior instance of the instruction specifying the second virtual address resolves,
    storing an indication of the prior instance of the instruction specifying the second virtual address in a miss tracking table (MTT), and
    determining, based on respective age values stored in the MTT, that a prior instance of the instruction specifying the first virtual address is the next oldest instruction that missed in the data cache relative to the prior instance of the instruction specifying the second virtual address;
  determining that first load instruction specifying the first virtual address misses in the data cache;
  receiving, from the ADP, a delta value based on a program counter value of the first load instruction;
  determining that a confidence value received from the ADP based on the program counter value of the first load instruction exceeds a predefined threshold;
  computing the second virtual address based on the delta value and the first virtual address; and
  prefetching, from the main memory to the data cache, data associated with the second virtual address prior to a second load instruction specifying the second virtual address missing in the data cache.

12. The apparatus of claim 11, the operation further comprising:

computing the delta value based on a difference of the first and second virtual addresses of the prior instances of the instructions specifying the first and second virtual addresses, respectively; and storing an indication of: (i) the program counter value, (ii) the computed delta value, and (iii) the confidence value in the ADP, wherein the program counter value of the first load instruction and the prior instance of the instruction specifying the first virtual address.

13. The apparatus of claim 11, the operation further comprising prior to storing the indication of the prior instance of the instruction specifying the second virtual address in the MTT:

determining that the prior instance of the instruction specifying the first virtual address missed in the data cache;

determining that the miss of the prior instance of the instruction specifying the first virtual address resolves; and storing an indication of the prior instance of the instruction specifying the first virtual address in the MTT.

14. The apparatus of claim 13, wherein the MTT comprises a plurality of entries, wherein each entry of the MTT is configured to store: (i) a program counter value, (ii) a virtual address, and (iii) an age value of a respective load instruction specifying a respective virtual address that misses in the data cache.

15. The apparatus of claim 11, the operation further comprising:

upon determining that the prefetching is served by the data cache, decrementing the confidence value in the ADP; and upon determining that the prefetching is served by the main memory, incrementing the confidence value in the ADP.

16. An apparatus, comprising:
an address delta predictor (ADP);
a miss tracking table;
a data cache;
a main memory;
means for prior to determining that a first load instruction specifying a first virtual address misses in a data cache:
  determining that a prior instance of an instruction specifying a second virtual address misses in the data cache,
  determining that the miss of the prior instance of the instruction specifying the second virtual address resolves,
  storing an indication of the prior instance of the instruction specifying the second virtual address in a miss tracking table (MTT), and
  determining, based on respective age values stored in the MTT, that a prior instance of the instruction specifying the first virtual address is the next oldest instruction that missed in the data cache relative to the prior instance of the instruction specifying the second virtual address;
means for determining that the first load instruction specifying the first virtual address misses in the data cache;
means for receiving, from the ADP, a delta value based on a program counter value of the first load instruction;

means for determining, prior to computing the second virtual address, that a confidence value received from the ADP based on the program counter value of the first load instruction exceeds a predefined threshold;

means for computing a second virtual address based on the delta value and the first virtual address; and means for prefetching, from the main memory to the data cache, data associated with the second virtual address prior to a second load instruction specifying the second virtual address missing in the data cache.

17. The apparatus of claim 16, further comprising:

means for computing the delta value based on a difference of the first and second virtual addresses of the prior instances of the instructions specifying the first and second virtual addresses, respectively; and means for storing an indication of: (i) the program counter value, (ii) the computed delta value, and (iii) the confidence value in the ADP, wherein the program counter value of the first load instruction and the prior instance of the instruction specifying the first virtual address.

18. The apparatus of claim 16, further comprising prior to storing the indication of the prior instance of the instruction specifying the second virtual address in the MTT:

means for determining that the prior instance of the instruction specifying the first virtual address missed in the data cache;

means for determining that the miss of the prior instance of the instruction specifying the first virtual address resolves; and means for storing an indication of the prior instance of the instruction specifying the first virtual address in the MTT.

19. The apparatus of claim 18, wherein the MTT comprises a plurality of entries, wherein each entry of the MTT comprises means for storing: (i) a program counter value, (ii) a virtual address, and (iii) an age value of a respective load instruction specifying a respective virtual address that misses in the data cache.

20. The apparatus of claim 16, further comprising:

means for decrementing the confidence value in the ADP upon determining that the prefetching is served by the data cache; and means for incrementing the confidence value in the ADP upon determining that the prefetching is served by the main memory.

* * * * *